(12) United States Patent
Keun

(10) Patent No.: US 7,200,915 B2
(45) Date of Patent: Apr. 10, 2007

(54) METHOD FOR CONTINUOUSLY JOINING A HANDRAIL FOR AN ESCALATOR OR MOVING WALKWAY

(75) Inventor: Christian-André Keun, Hamburg (DE)

(73) Assignee: New-York Hamburger Gunni-Waaren Compagnie AG, Hamburg (DE)

( * ) Notice: Subject to any disclaimer, the term of this patent is extended or adjusted under 35 U.S.C. 154(b) by 296 days.

(21) Appl. No.: 10/951,919

(22) Filed: Sep. 27, 2004

(65) Prior Publication Data
US 2005/0066500 A1 Mar. 31, 2005

(30) Foreign Application Priority Data
Sep. 25, 2003 (DE) ................. 103 44 468

(51) Int. Cl.
  B23P 17/00 (2006.01)
  B65G 15/00 (2006.01)
(52) U.S. Cl. .............. 29/527.1; 29/432.1; 29/446; 198/337; 264/248; 264/249; 264/279.1
(58) Field of Classification Search ............. 29/527.1, 29/446, 432.1, 428, 564.1, 564.2, 564.7, 29/33 K; 198/335, 336, 337; 264/248, 249, 264/279.1
See application file for complete search history.

(56) References Cited

U.S. PATENT DOCUMENTS

| | | | | |
|---|---|---|---|---|
| 2,319,372 A | * | 5/1943 | Tilton | 425/108 |
| 3,740,799 A | * | 6/1973 | Earle | 24/33 B |
| 3,778,882 A | * | 12/1973 | Cameron et al. | 29/450 |
| 4,453,910 A | * | 6/1984 | Ball | 425/12 |
| 4,588,460 A | * | 5/1986 | Magee et al. | 156/96 |
| 4,618,387 A | * | 10/1986 | Fisher et al. | 156/244.11 |
| 4,909,873 A | * | 3/1990 | Detwiler | 156/96 |
| 5,160,009 A | * | 11/1992 | Iyoda et al. | 198/337 |
| 5,204,036 A | * | 4/1993 | MacMillan | 264/152 |
| 5,255,772 A | * | 10/1993 | Ball et al. | 198/337 |
| 5,275,270 A | * | 1/1994 | Dobo | 198/337 |
| 6,086,806 A | * | 7/2000 | Weatherall et al. | 264/152 |
| 6,237,740 B1 | * | 5/2001 | Weatherall et al. | 198/337 |
| 6,497,318 B2 | * | 12/2002 | Schulte et al. | 198/337 |
| 6,761,259 B1 | * | 7/2004 | Onodera et al. | 198/335 |
| 7,083,037 B2 | * | 8/2006 | Durrer et al. | 198/335 |

* cited by examiner

Primary Examiner—Essama Omgba
(74) Attorney, Agent, or Firm—W. F. Fasse; W. G. Fasse

(57) ABSTRACT

Two opposite ends of a handrail stock member are joined to form a handrail having a closed-loop configuration for an escalator or the like. A slot is cut into each end, parallel to a longitudinal reinforcement layer of the handrail stock member. A joint reinforcement insert including longitudinally-oriented high-strength high-stiffness fibers is inserted into the two slots and the two ends are butted together. A thermoplastic matrix material of the handrail stock member in the joint area is heated to a softening or melting temperature and is press-molded to penetrate into the reinforcement insert and bond the insert to portions of the reinforcement layer overlapped by the insert. The matrix material is fused across the junction plane. A pressing mold maintains the defined outer contour of the handrail.

14 Claims, 2 Drawing Sheets

METHOD FOR CONTINUOUSLY JOINING A HANDRAIL FOR AN ESCALATOR OR MOVING WALKWAY

PRIORITY CLAIM

This application is based on and claims the priority under 35 U.S.C. §119 of German Patent Application 103 44 468.8, filed on Sep. 25, 2003, the entire disclosure of which is incorporated herein by reference.

FIELD OF THE INVENTION

The invention relates to a method for joining the terminal ends of a handrail member, to form a continuous closed-loop handrail for an escalator (i.e. moving stairway) or a moving walkway.

BACKGROUND INFORMATION

As is conventionally known, escalators and moving walkways typically use a handrail in the form of a continuous closed loop or ring, which runs in a continuous circulating manner over suitable guides and the like substantially in synchronism with the escalator treads or the moving walkway. While such a handrail is in the form of a continuous closed loop in its installed and operating condition, it is typically produced from a finite handrail stock material extending longitudinally as a long strip with two terminal ends. To manufacture the finished closed-loop handrail, it is thus necessary to continuously join the two opposite terminal ends of a handrail stock member to each other so as to close the loop. The continuous junction formed in this manner should be substantially smooth and not conspicuous as a junction. Also, the junction must effectively transmit the arising tension continuously along the handrail through this junction, which has been found to be difficult or problematic in practice.

Such a handrail stock member or strip may comprise a handgrip member or main body part made of a polymeric material, and at least one reinforcing layer of longitudinally extending high strength polymer fibers embedded in the polymeric material to take up and transmit tension forces along the longitudinal extending length of the handrail. The handrail stock strip may further include a layer of textile plies arranged crosswise relative to each other and particularly including fibers or threads extending in the transverse or crosswise direction, and still further a low-friction sliding layer forming an inner sliding surface of the handrail. The several layers can be combined or incorporated together to form a one-piece laminated textile structure, which is then embedded and bonded to the polymeric matrix material of the handgrip member or main body part to form the handrail stock member or strip.

With regard to the particular materials, it is known to make the handgrip member or main body part of rubber or a thermoplastic elastomer material, which is reinforced by individual reinforcement fibers of steel (steel cord) or various high strength polymers (e.g. aramid, polyamide, polyester) extending in the longitudinal direction. Further woven fabric layers or plies can additionally be provided to stiffen the profile of the handrail, for example especially also in the transverse or crosswise direction.

To fabricate the closed-loop handrail, such a handrail stock member or strip is cut to the appropriate length, and then the opposite terminal ends thereof are continuously joined at a junction as generally described above. In this regard, it is also necessary to join the ends of the longitudinally extending reinforcement layer to each other, so as to continuously transmit the tension forces through the reinforcing layer across the junction.

To form the continuous junction as mentioned above, including the tension-transmitting junction of the longitudinal reinforcing layer, it is conventionally known to carry out a process as follows. First, it is necessary to partially free and expose the individual reinforcing fibers (and if applicable the woven fabric plies) from the matrix material at the terminal ends of the handgrip member. This is achieved, for example, by cutting away and removing portions of the matrix material. Then, the terminal ends that have been prepared in this manner are laid into a mold, so that the individual fiber ends adjoin and lie against one another laterally or in a sideways direction, while the remaining fabric plies overlap one another. Next, a sufficient quantity of matrix material (e.g. as an uncured liquid) is introduced (e.g. poured or injected) into the mold to fill out the volume of the portion of the handgrip member that has been removed to expose the reinforcing fibers and the like. This matrix material flows around and is pressed into the spaces around the individual reinforcing fibers and the fabric plies so as to embed the fibers and plies therein. Finally, the matrix material is consolidated, cured and hardened under pressure in the mold. This process for fabricating a continuous joint or junction of the terminal ends of the handrail is very complicated, difficult and time consuming, and thus cannot be economically carried out.

SUMMARY OF THE INVENTION

In view of the above, it is an object of the invention to provide a method as well as an apparatus for joining the ends of a handrail member to form a continuous junction of a closed loop handrail for an escalator, moving walkway or the like. The invention particularly aims to make such a method simpler, less time-consuming, and less costly than the known prior art methods. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a method of forming a continuous junction of an endless or closed-loop handrail for an escalator, moving stairway, moving walkway, or the like, with steps as follows.

The method begins with providing a handrail stock member in the form of an elongated strip extending in a longitudinal direction, having two opposite terminal ends, and including a handgrip member or main body part made of a polymeric material and at least one longitudinal reinforcement layer that includes longitudinally extending high strength polymer fibers and that is adapted to take up tension forces in the handrail. The longitudinal reinforcement layer is embedded in or bonded to the handgrip member or main body part made of polymeric material. The handrail stock member may further include a layer for stabilizing the sectional shape or form of the handrail, comprising textile plies arranged in a crosswise or transverse direction relative to the longitudinal direction of the handrail, and/or respectively relative to one another in succession. The handrail stock member may still further comprise a low-friction slide layer on an inner surface of the handrail stock member.

The inventive method proceeds by preparing each one of the terminal ends of the handrail stock member, by forming a slot or slit extending from the terminal end into the handrail stock member along a slot plane extending along the longitudinal direction and parallel to a top surface of the handrail stock member, or parallel and proximate to the longitudinal reinforcement layer. Preferably, the slot extends immediately adjacent to, along, and either above or below the longitudinal reinforcement layer for a defined limited distance in said longitudinal direction extending from the terminal end. The slot may extend through the entire width of the handrail stock member parallel to the longitudinal reinforcement layer. The slot is preferably a knife-cut slit formed by cutting the polymeric material of the handrail stock member with a knife blade, so that no material of the handrail stock member is lost due to the cutting.

Once both opposite terminal ends of the handrail stock member have been provided with slots, the two opposite terminal ends are arranged to face one another, with the handrail stock member in a closed-loop configuration and with the two slots of the two terminal ends aligned on a common plane across the joint plane defined by the abutting terminal ends. A joint reinforcement insert is inserted into the coplanar slots in the two opposite facing or abutting terminal ends so as to span across the joint plane between the two abutting terminal ends. The joint reinforcement insert is a flat planar element of a material comprising at least high strength and high stiffness fibers extending in the longitudinal direction of the handrail stock member. Preferably, the joint reinforcement insert has properties, fiber components, and a composition similar to or the same as the longitudinal reinforcement layer.

Next, the abutted terminal ends of the handrail stock member with the joint reinforcement insert in the slots thereof are received in a mold cavity of a pressing mold. In the pressing mold, at least a certain portion of the handrail stock member adjoining the slots adjacent to the joint plane is heated to a sufficient temperature so that the polymeric matrix material of the main body part of the handrail stock member will be at least softened or melted. Also, the portion of the handrail stock member in the pressing mold is pressed in the mold so as to penetrate or impregnate the softened or melted polymeric matrix material into the joint reinforcement insert. Preferably also, the softened or melted matrix material is fused across the joint plane, while being pressed and molded in the pressing mold. The heated portions of the handrail stock member are then cooled sufficiently to cure, harden, or solidify the matrix material, thereby fixing the joint reinforcement insert and forming the continuous junction of the two terminal ends of the handrail stock member to form the handrail with a continuous closed-loop configuration.

Thereby, the joint reinforcement insert is securely fixed to the end portions of the longitudinal reinforcement layer overlapped by the joint reinforcement insert over a range extending from the joint plane in both directions, such that the joint reinforcement insert can transmit tension forces continuously in the longitudinal direction through the area of the junction and couple the tension forces into and out of the longitudinal reinforcement layer by shear forces therebetween. Also, the handgrip member or main body part of the handrail is smoothly and continuously fused through the area of the junction.

According to further advantageous features of the invention, the joint reinforcement insert comprises a thin textile material of high strength and high stiffness polymer fibers. Namely, in addition to the fibers extending in the longitudinal direction, the joint reinforcement insert may further comprise fibers extending in the transverse or crosswise direction, e.g. perpendicular to the longitudinal direction. By using high strength and high stiffness polymer fibers in the joint reinforcement insert, this insert can be made very thin, while still achieving the required tensile strength for transmitting the longitudinal tensions through the area of the continuous junction. Thereby also, the bending stiffness of the handrail is only slightly increased in the area of the continuous junction.

The above objects have further been achieved according to the invention in an apparatus for carrying out a method generally as set forth herein. The apparatus includes a pressing mold defining a mold cavity that is configured and adapted to the sectional configuration of the handrail to be produced, and that has a mold heater adapted to heat the pressing mold above a softening temperature (and if desired even above a melting temperature) of the matrix material of the handrail. The pressing mold may further include a mold cooler arrangement adapted to cool the pressing mold during and/or after the heating and molding process. Preferably, the pressing mold includes an upper shell and a lower shell that are separatable and relatively movable, and that receive the cross-section of the handrail in the corresponding mold cavity formed between the upper shell and the lower shell. The pressing mold further preferably includes a mold core member movably arranged relative to the upper shell, and configured and adapted to fit into a hollow inner cross-section of the handrail. Thereby, the core member cooperates with the upper shell and the lower shell to heat, press, and mold the handrail during the junction-forming process.

The apparatus further includes a slot cutting device comprising a handrail holding arrangement and a slot cutting knife blade that are movable relative to each other, so that the knife blade can cut the slot adjacent to the longitudinal reinforcing layer in each terminal end of the handrail stock member.

With the inventive method and apparatus, the two opposite terminal ends of the handrail stock member can be quickly and easily prepared for forming the continuous junction thereof, by slitting or cutting the respective terminal end with the knife blade of the cutting device, and then inserting the joint reinforcement insert. This cutting device is also portable and mobile, to be used "in the field" for forming a continuous junction of the handrail as necessary for the particular installation at hand. Similarly the heated, and if applicable cooled, pressing mold is easy to use and is portable for quickly, easily, and economically forming a continuous junction of the terminal ends of the handrail stock member to form the closed-loop handrail. In that regard, the pressing mold also ensures that a high internal strength and a high outer surface quality of the continuous junction is achieved.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

In order to form a continuous closed-loop handrail for an escalator or the like, the two opposite terminal ends 1A of a handrail stock member 1 will be joined to each other along a joint or junction plane to form a continuous junction, with the handrail stock member 1 in a closed-loop configuration. The handrail stock member 1 includes a main body part that forms the handgrip of the handrail member and that is made of a thermoplastic polymer material. The handrail stock member further includes at least one longitudinal reinforcement layer 3 that is bonded to or embedded in the handrail main body part. The longitudinal reinforcement layer 3 includes high strength polymer fibers extending in a longitudinal direction longitudinally along the handrail stock member 1. The polymer matrix material as well as the reinforcement fibers may have any composition conventionally known in this art.

Figure 1:
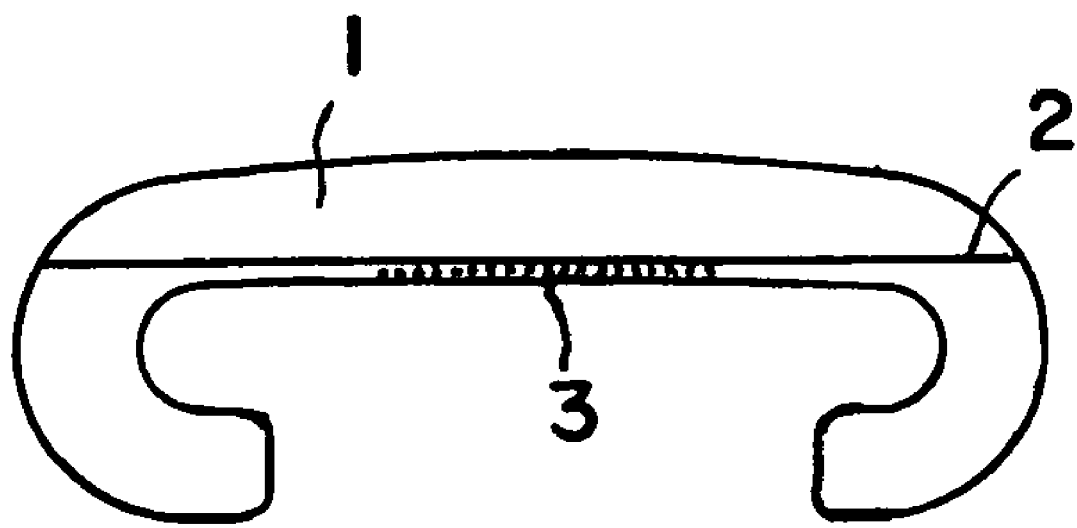
FIG. 1 is a schematic profile end view of a terminal end of a handrail stock member having a cut slot plane proximate to and above the longitudinal reinforcement layer.
Figure 2:
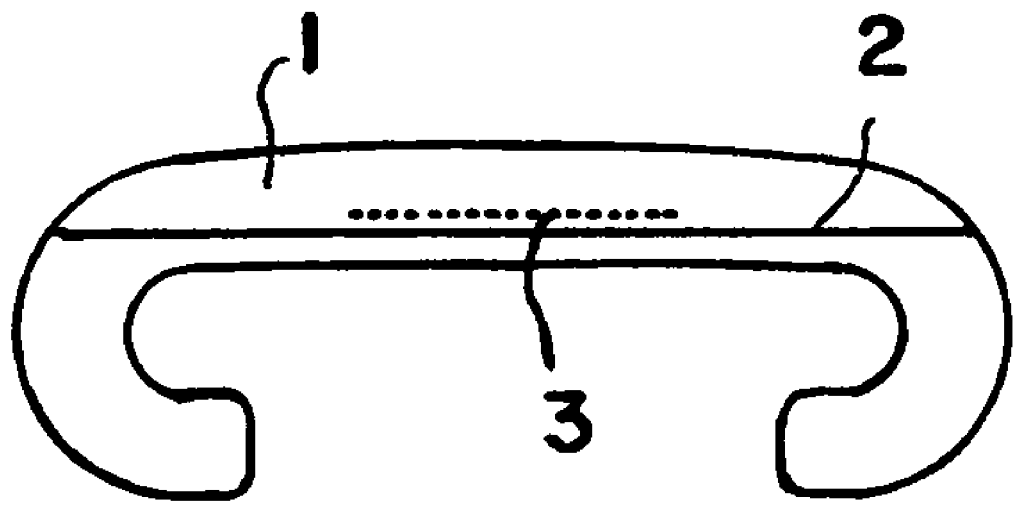
FIG. 2 is a schematic end view similar to FIG. 1, but showing an alternative cut slot plane proximate to and below the longitudinal reinforcement layer.

In order to form the continuous junction of the two opposite terminal ends 1A of the handrail stock member 1, it is first necessary to prepare the ends 1A by forming a slot or slit 2 along a plane extending parallel to and closely along the longitudinal reinforcement layer 3. Thus, the slot 2 extends horizontally in the vertical cross-section view of FIGS. 1 and 2, substantially parallel to a top surface of the handrail stock member. As shown in FIG. 1, the slot 2 may be formed directly or closely above the longitudinal reinforcement layer 3. Or as shown in FIG. 2, the slot 2 may be formed directly or closely below the longitudinal reinforcement layer 3. The slot 2 being "proximate" or "close" to the reinforcement layer 3, means that the slot 2 is sufficiently near the layer 3 so that the joint reinforcement insert 4 inserted in the slot 2 (as described below) will be bonded to the layer 3 for the transmission of tension forces by the inventive junction forming method. Preferably, the slot 2 extends directly along the upper or lower side of the longitudinal reinforcement layer 3, so that the slot 2 extends along or exposes the longitudinally extending reinforcement fibers of the layer 3.

Figure 3:
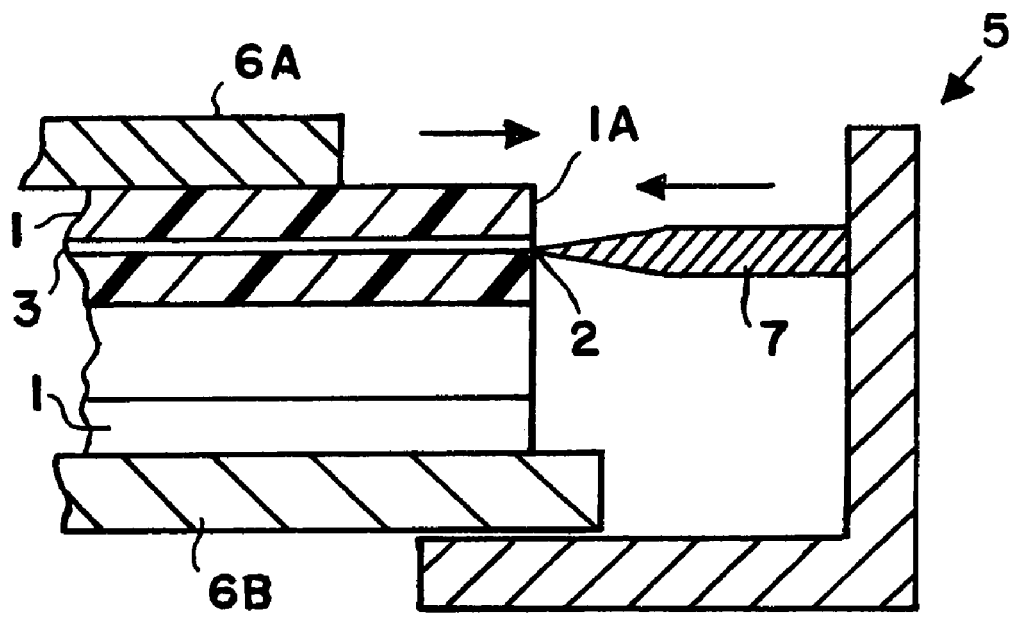
FIG. 3 is a side longitudinal-section view of an end portion of the handrail stock member adjoining a terminal end, received in a slot cutting device for forming the cut slot therein.

The slot 2 is preferably formed by cutting the thermoplastic matrix material of the handrail stock member 1 with a knife blade. Thereby, the matrix material is simply parted along the slot 2, and none of the matrix material is lost (e.g. as would occur by using a saw or the like to form the slot 2). This slot cutting operation can be performed manually with a suitable knife, or in an at least partially automated or mechanized manner using a cutting or slitting apparatus 5 as schematically represented in FIG. 3. In this regard, each end 1A of the handrail stock member 1 is respectively arranged in the cutting apparatus 5. A cutting knife blade 7 of the apparatus 5 faces toward and is arranged to cut into the respective terminal end 1A of the handrail stock member 1, along a cutting plane corresponding to the desired location of the slot or slit 2, preferably directly along the upper or lower side of the longitudinal reinforcement layer 3. The end portion of the handrail stock member 1 is secured in a holding or clamping jig, for example between a top holding jaw 6A and a bottom holding jaw 6B. Then the holding jig 6A, 6B and the cutting knife blade 7 are moved relatively toward one another as shown by the respective arrows, so that the knife blade 7 cuts the slot 2 to a prescribe longitudinal distance or length into the main body part of the handrail stock member 1. This relative motion of the holding or clamping jig 6A, 6B and the knife blade 7 can involve a movement of either one or both of these apparatus components, either manually or through power-actuated operation.

After both terminal ends 1A of the handrail stock member 1 have been prepared by cutting the slots 2 respectively therein as shown in FIG. 3, a joint reinforcement insert 4 is inserted into the slots 2 while the two opposite terminal ends 1A are butted together to form a joint plane of the continuous junction to be formed in the closed-loop configuration of the handrail. The joint reinforcement insert 4 is inserted into the slots 2 of the two facing terminal ends 1A of the handrail stock member 1 so as to extend longitudinally along and overlap respective portions of the longitudinal reinforcement layer 3 adjoining the terminal ends 1A. The joint reinforcement insert 4 is preferably a thin planar textile layer or tape comprising high strength, high stiffness fibers that are oriented very precisely to extend in the longitudinal direction of the handrail stock member 1. The textile layer can further comprise fibers extending in the crosswise or transverse direction perpendicular to the longitudinal direction, to ensure that the profile stiffness and configuration of the handrail stock member 1 is maintained even through the area of the continuous junction of the finished handrail.

Figure 4:
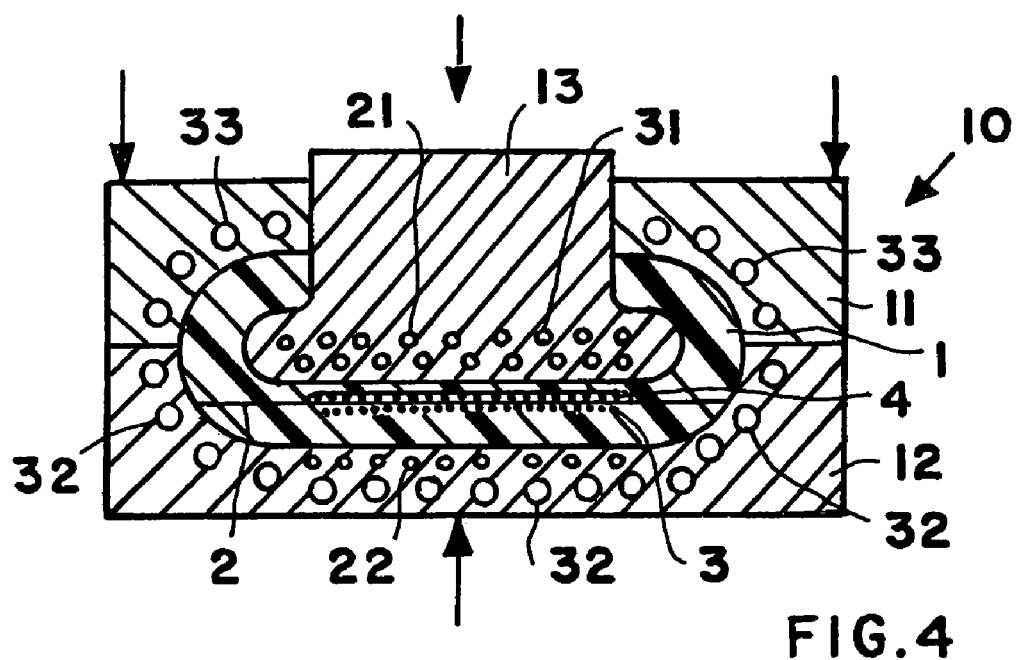
FIG. 4 is a schematic cross-section view of the area of the continuous junction to be formed in the handrail received in a heated and cooled pressing mold adapted to thermally fuse the ends of the handrail stock member together to form the continuous junction.

The thusly prepared and butted-together end portions adjoining the ends 1A of the handrail stock member 1 are laid into a pressing mold 10 as represented in FIG. 4. This pressing mold 10 forms a mold cavity that corresponds to the outer contour of the handrail stock member 1, and also the outer contour of the cross-sectional profile of the finished handrail to be formed. The mold cavity has open ends to allow the remainder (other than the end portions to be joined) of the handrail stock member 1 to protrude out of the pressing mold 10.

In the particular example embodiment shown in FIG. 4, the pressing mold 10 includes an upper shell 11, a lower shell 12, and a mold core 13 that are movable relative to each other so as to selectively open or close a mold cavity defined between the upper shell 11 and the lower shell 12 along a mold parting plane. The mold core 13 has a sectional shape that matches and maintains the sectional shape of a hollow interior section of the handrail stock member 1. This core 13 may be inserted into the hollow interior section of the handrail stock member 1, before further arranging the handrail stock member 1 in the mold cavity between the upper shell 11 and the lower shell 12. This can be achieved, for example, due to the flexibility of the handrail stock member 1 and/or by slidingly inserting the mold core 13 into the open terminal ends 1A of the handrail stock member 1 as the terminal ends 1A are pushed toward one another and abutted together. The upper shell 11 has a hole therein for receiving the core 13.

Once the arrangement is assembled or arranged as shown and described above, the upper shell 11 and the mold core 13 are pushed downwardly while the lower shell 12 is pushed upwardly relative to one another (as shown by the arrows), and a process of heating, pressing, and molding the handrail arrangement is carried out as follows. Note that the handrail stock member 1 is arranged "upside down" in comparison to the orientation of FIGS. 1 and 2, namely with the ultimate exposed top surface of the handgrip member oriented downwardly. Also, while FIG. 4 merely shows a section through the area of the junction, it should be understood that the pressing mold 10 extends longitudinally along the handrail stock member to a defined length in both directions from the joint plane of the junction to be formed.

The pressing mold 10 includes a core heater 21 arranged in the lower face of the mold core 13 and/or a lower shell heater 22 arranged in the upper face of the lower shell 12. This heater 21 and/or 22 may, for example, comprise flow channels or conduits through which a heated fluid may flow, or an electric resistance heater, or a thermoelectric heating element, or any other known mold heater arrangement.

The pressing mold 10 further includes a core cooler 31 in the core 13, and/or a lower shell cooler 32 in the lower shell 12, and/or an upper shell cooler 33 in the upper shell 11. These coolers may comprise a system of conduits or channels through which a cooling fluid may flow, or a thermoelectric cooling element, or any other known arrangement for cooling a mold. At both ends and/or both sides, the upper shell 11 and the lower shell 12 of the pressing mold 10 are permanently or continuously cooled by the associated cooler arrangements 33 and 32. On the other hand, in a middle area spanning the joint plane and extending along the area of the joint reinforcement insert 4, the core heater 21 and/or the lower shell heater 22 may be selectively activated to heat this area of the pressing mold 10. Alternatively and selectively, the core cooler 31 and the lower shell cooler 32 may be activated in this area, to cool this area of the handrail arrangement.

Through a suitable activation and temperature control of the heaters and/or coolers, the handrail stock member 1 is heated to above a softening temperature, or even above a melting temperature, of the thermoplastic matrix material thereof in a middle or central area adjoining the joint reinforcement insert 4, i.e. along the slot 2. Thus, the thermoplastic matrix material in this area is softened or even melted, and subjected to the molding pressure exerted by the pressing mold 10, so that the matrix material is pressed and penetrated and impregnated into the joint reinforcement insert 4. Thereby, the softened or melted thermoplastic matrix material uniformly and continuously bonds the joint reinforcement insert 4 to the longitudinal reinforcement layer 3. This is facilitated and ensured by the pressing force applied by the mold core 13, the upper shell 11, and the lower shell 12 as indicated by corresponding arrows. Particularly, the mold core 13 is moved with a defined force or a defined displacement relative to the upper shell 11 and the lower shell 12 to exert the required molding pressure.

Throughout this process, the areas of the pressing mold 10 away from the portion of the handrail stock member 1 to be melted (e.g. away from the slot 2) are continuously maintained at a sufficiently cool temperature below the softening temperature of the thermoplastic matrix material, so that the corresponding portions of the handrail stock member 1 are not melted or softened. Also, after the softening or melting of the portion of the thermoplastic matrix material in the area of the joint reinforcement insert 4 has been achieved as described above, then the heater(s) 21 and/or 22 is/are deactivated, and instead all of the coolers 31, 32, 33 are activated to cool and solidify the previously softened or molten thermoplastic matrix material.

Thereby, the joint reinforcement insert 4 is securely and permanently fixed and adhesively bonded to the portions of the longitudinal reinforcement layer 3 overlapped by the insert 4, through the re-solidified thermoplastic matrix material. As a result, tension forces are transmitted from the longitudinal reinforcement layer 3 to the joint reinforcement insert 4, and vice versa, through shear stresses along the overlapping interfaces. Also, the softening or melting and press-molding of the thermoplastic matrix material of the handrail stock member 1 has intermingled and fused the thermoplastic matrix material across the joint plane defined by the abutting terminal ends 1A, so that the subsequent cooling and re-solidifying forms a continuous fused material of the main body of the handrail stock member 1 across the formed continuous junction.

By cooling the portions of the handrail stock member 1 surrounding the immediate location of the insert 4, and by press-molding the insert in the mold cavity of the pressing mold 10 that corresponds to the outer contour of the handrail stock member 1, it is ensured that the cross-sectional shape and outer contour of the handrail stock member 1 will not be deformed through this process, even due to the pressing force applied by the mold core 13. Instead, the pressure applied by the mold core 13 serves to pressurize the softened or molten thermoplastic matrix material, thereby ensuring that this material permeates into the joint reinforcement insert 4.

The particular arrangement of the heaters and coolers can be selected as needed, depending on the configuration and heating requirements of the handrail construction at hand. For example, it is possible to provide only the core heater 21 in the mold core 13, without providing the lower shell heater 22. In such an embodiment, only the lower shell cooler 32 and the upper shell cooler 33 are provided in the shells 12 and 11. Thereby, the heating of the handrail stock member 1 proceeds entirely from the "inner" surface thereof adjoining the mold core 13. This is especially suitable when the slot 2 and the joint reinforcement insert 4 received therein are quite close to the inner surface side of the handrail stock member 1, for example as shown in FIG. 1.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of forming a continuous closed-loop handrail for a moving stairway or moving walkway, comprising the steps:
    a) providing an elongated handrail stock member that extends in a longitudinal direction, has two opposite terminal ends, and comprises a handrail body and a longitudinal reinforcement layer, wherein said handrail body comprises a polymeric material, and wherein said longitudinal reinforcement layer comprises longitudinal reinforcement fibers that extend in said longitudinal direction, are embedded in or bonded to said handrail body, and are adapted to take up tension forces in said longitudinal direction;
    b) respectively forming in each one of said terminal ends, a slot respectively extending with a limited length in said longitudinal direction, parallel and proximate to said longitudinal reinforcement layer;
    c) arranging said handrail stock member in a loop configuration with said terminal ends facing one another across a joint plane defined therebetween, with said respective slots aligned coplanar with one another on opposite sides of said joint plane;
    d) inserting a joint reinforcement insert into said slots and spanning across said joint plane, wherein said joint reinforcement insert is a flat planar element comprising joint reinforcement fibers extending in said longitudinal direction;

e) heating a first portion of said handrail body along said slots so as to soften or melt said polymeric material of said first portion;

f) press-molding said handrail body so as to penetrate said polymeric material that has been softened or melted into said joint reinforcement insert along said slots; and g) cooling said first portion of said handrail body to harden said polymeric material that had been softened or melted, thereby bonding said joint reinforcement insert into said polymeric material of said handrail body and forming a junction between said terminal ends across said joint plane.

2. The method according to claim 1, wherein said steps e), f) and g) further thermally fuse together said polymeric material of said terminal ends of said handrail body across said joint plane.

3. The method according to claim 1, wherein said step d) results in said joint reinforcement insert extending along and overlapping an overlapping range of said longitudinal reinforcement layer in said longitudinal direction in both said terminal ends on both opposite sides of said joint plane, and said steps e), f) and g) result in said polymeric material bonding said joint reinforcement insert to said longitudinal reinforcement layer in said overlapping range so as to transmit tension forces between said longitudinal reinforcement fibers and said joint reinforcement fibers through shear forces transmitted between said longitudinal reinforcement layer and said joint reinforcement insert.

4. The method according to claim 1, wherein said step b) comprises forming said slot directly along and exposing one major surface of said longitudinal reinforcement layer, and said step d) causes said joint reinforcement fibers of said joint reinforcement insert to be in contact with and extend parallel along said longitudinal reinforcement fibers of said longitudinal reinforcement layer.

5. The method according to claim 1, wherein said step b) comprises forming said slot as a knife-cut slit by cutting said handrail stock member with a knife blade so as to part said handrail body along said knife-cut slit.

6. The method according to claim 5, wherein said knife-cut slit extends continuously and entirely through a width of said handrail body parallel to said longitudinal reinforcement layer.

7. The method according to claim 1, wherein said longitudinal reinforcement fibers and said joint reinforcement fibers are respectively fibers of mutually the same high-strength high-stiffness polymer fiber material.

8. The method according to claim 1, wherein said flat planar element of said joint reinforcement insert is a thin textile structure including said joint reinforcement fibers.

9. The method according to claim 1, wherein said flat planar element of said joint reinforcement insert further includes transverse fibers extending transversely relative to said joint reinforcement fibers.

10. The method according to claim 1, wherein at least said steps e) and f) are carried out with end portions of said handrail stock member adjoining said terminal ends arranged in a selectively heatable press-molding apparatus having a mold cavity with a cavity contour matching an outer sectional contour of said handrail stock member.

11. The method according to claim 1, wherein said cooling in said step g) comprises selectively actuatable active cooling that is actuated after ending said heating of said step e).

12. The method according to claim 1, further comprising, during said step e), actively cooling a second portion of said handrail body adjacent to said first portion and displaced away from said slots, to prevent said polymeric material of said second portion from melting or to prevent said polymeric material of said second portion from softening as much as said polymeric material of said first portion.

13. The method according to claim 1, wherein said step b) is carried out without removing or losing any of said polymeric material of said handrail body.

14. The method according to claim 1, wherein said method does not comprise adding any additional polymeric matrix material for bonding said joint reinforcement insert into said handrail body or for forming said junction.

* * * * *

UNITED STATES PATENT AND TRADEMARK OFFICE
CERTIFICATE OF CORRECTION

PATENT NO. : 7,200,915 B2  Page 1 of 1
APPLICATION NO. : 10/951919
DATED : April 10, 2007
INVENTOR(S) : Keun It is certified that error appears in the above-identified patent and that said Letters Patent is hereby corrected as shown below:

<u>Title page,</u>
Item [73], Assignee,
Line 1, after "Hamburger", replace "Gunni-Waaren" by --Gummi-Waaren--.

Signed and Sealed this

Thirtieth Day of October, 2007

JON W. DUDAS
*Director of the United States Patent and Trademark Office*